US010571566B2

(12) United States Patent
Eibye et al.

(10) Patent No.: US 10,571,566 B2
(45) Date of Patent: Feb. 25, 2020

(54) MULTI-CLIENT ULTRASOUND IMAGING SYSTEM

(71) Applicant: B-K MEDICAL APS, Herlev (DK)

(72) Inventors: Michael Knud Eibye, Ballerup (DK); Jesper Lomborg Manigoff, Frederiksberg C (DK)

(73) Assignee: B-K Medical Aps, Herlev (DK)

( * ) Notice: Subject to any disclaimer, the term of this patent is extended or adjusted under 35 U.S.C. 154(b) by 1189 days.

(21) Appl. No.: 14/766,410

(22) PCT Filed: Feb. 14, 2013

(86) PCT No.: PCT/IB2013/000194
§ 371 (c)(1),
(2) Date: Aug. 6, 2015

(87) PCT Pub. No.: WO2014/125316
PCT Pub. Date: Aug. 21, 2014

(65) Prior Publication Data
US 2015/0369915 A1    Dec. 24, 2015

(51) Int. Cl.
*A61B 8/00*         (2006.01)
*G01S 15/89*        (2006.01)
(Continued)

(52) U.S. Cl.
CPC .......... *G01S 15/8906* (2013.01); *G01S 7/003* (2013.01); *G01S 7/52082* (2013.01); *G06F 9/5027* (2013.01); *G06F 2209/5021* (2013.01)

(58) Field of Classification Search
CPC ....................................................... G01S 7/003
See application file for complete search history.

(56) References Cited

U.S. PATENT DOCUMENTS 6,839,762 B1 *  1/2005  Yu ................. A61B 5/0456
                                              709/230
2003/0007598 A1 * 1/2003  Wang .............. A61B 6/463
                                              378/37

(Continued)

OTHER PUBLICATIONS

Meir et al (Distributed network, wireless and cloud computing enabled 3-D ultrasound; a new medical technology paradiggm).*

(Continued)

*Primary Examiner* — Joel F Brutus
(74) *Attorney, Agent, or Firm* — Anthony M. Del Zoppo, III; Daugherty & Del Zoppo Co. LPA

(57) ABSTRACT

An ultrasound imaging scanner includes an ultrasound input device (104), of a plurality of ultrasound input devices, that includes an array of transducer elements, which transmits an ultrasound signal and receives an echo signal produced in response thereto; and a multi-client ultrasound imaging data processing system (106) that includes processing resources which are shared by the plurality of ultrasound input devices, wherein the processing resources include a plurality of ultrasound signal processing units, each including a plurality of ultrasound signal processing blocks configured to processes echo signals, and wherein the multi-client ultrasound imaging data system temporarily allocates at least one ultrasound signal processing block to process the received echo signal of the ultrasound input device, generating an image indicative thereof.

24 Claims, 5 Drawing Sheets

(51) Int. Cl.
*G01S 7/00* (2006.01)
*G01S 7/52* (2006.01)
*G06F 9/50* (2006.01)

(56) References Cited

U.S. PATENT DOCUMENTS

| | | |
|---|---|---|
| 2003/0181804 A1 | 9/2003 | Gagnon et al. |
| 2005/0265267 A1* | 12/2005 | Hwang ................ G06F 19/321 370/310 |
| 2006/0052703 A1* | 3/2006 | Kumazawa ............. A61B 8/58 600/447 |
| 2007/0046966 A1 | 3/2007 | Mussack et al. |
| 2008/0139938 A1* | 6/2008 | Yang .................... A61B 5/1075 600/445 |
| 2009/0093980 A1 | 4/2009 | Kemp et al. |

OTHER PUBLICATIONS

International search report for PCT/IB2013/000194 published as WO 2014/125316 A1.
V. Vinothina, A Survey on Resource Allocation Strategies in Cloud Computing, International Journal of Advanced computer Science and Applications, Jun. 2012, pp. 97-104, vol. 3, No. 6.
Arie Meir, Distributed Network, Wireless and Cloud Computing Enabled 3-D Ultrasound; a new Medical Technology Paradigm, PLoS ONE, Nov. 2009, pp. 1-8, vol. 4, Issue 11, www.plosone.org.
T.R. Gopalakrishnan Nair, Efficient Resource Arbitration and Allocation Strategies in cloud computing Through Virtualization, Proceeding of IEEE CCIS2011, 2011, pp. 397-401.

\* cited by examiner

MULTI-CLIENT ULTRASOUND IMAGING SYSTEM

RELATED APPLICATION

This application is a national filing of PCT application Serial No. PCT/IB2013/000194, filed Feb. 14, 2013, published as WO2014/125316 on Aug. 21, 2014. This application claims priority to PCT application Serial No. PCT/IB2013/000194, published as WO2014/125316 on Aug. 21, 2014.

TECHNICAL FIELD

The following generally relates to ultrasound and more particularly to a multi-client ultrasound imaging system.

BACKGROUND

Ultrasound (US) imaging has provided useful information about the interior characteristics of an object or subject under examination. An ultrasound imaging scanner has included an input device (e.g., a transducer array of one or more transducer elements) that produces and transmits ultrasound signals and receives ultrasound data produced in response to the ultrasound data interacting with structure, hardware and/or software that processes the received ultrasound data, and a user interface that visually presents the processed data and, in some instance, allows for manipulating (e.g., rotate, zoom, pan, etc.) the visually presented processed data.

With a hand held ultrasound imaging scanner, the input device, the hardware and/or software, and the user interface have been housed in a same housing, which can be carried around by a user and utilized to scan a subject or object. In another configuration, the input device includes a probe that houses the transducer array and that connects, via a cable or the like and/or wirelessly, to a separate apparatus (e.g., a console), which includes the hardware and/or software and processes the ultrasound data and generates images. The user interface may be part of the console or separate from the console, and is used to display the images. Both of these configurations include a set of static and dedicated components, which make up the scanner.

However, with the above configurations, a customer, before or at the time of purchase of an ultrasound imaging scanner, decides on the type of imaging scanner (e.g., premium, high, medium, or low performance) via selecting input device and/or hardware and/or software options. As a consequence, if the customer purchases a low end ultrasound imaging scanner, they will not have the option of performing a high end scans with the low end ultrasound imaging scanner. Alternatively, if the customer purchases a high end ultrasound imaging scanner, they will have paid a high end price, even when the ultrasound imaging scanner is used for low end imaging.

Furthermore, with the above configurations, if a clinician has reserved the ultrasound imaging scanner for an examination, the processing hardware and/or software of that scanner will be unavailable to other clinicians, even when the reserved ultrasound imaging scanner is sitting idle and other clinicians would like to scan with available ultrasound probes that could be utilized with the hardware and/or software of the reserved ultrasound imaging scanner. Moreover, updated and/or new hardware and/or software of interest may not be supported by the purchased ultrasound imaging scanner. Thus, a customer may have to purchase another scanner in order to use the updated and/or new hardware and/or software.

SUMMARY

Aspects of the application address the above matters, and others.

In one aspect, an ultrasound imaging scanner includes an ultrasound input device, of a plurality of ultrasound input devices, that includes an array of transducer elements, which transmits an ultrasound signal and receives ultrasound data produced in response thereto. The ultrasound imaging scanner further includes a multi-client ultrasound imaging data processing system that includes processing resources which are shared by the plurality of ultrasound input devices. The processing resources include a plurality of ultrasound signal processing units, each including a plurality of ultrasound signal processing blocks configured to processes ultrasound data. The multi-client ultrasound imaging data system temporarily allocates at least one ultrasound signal processing block to process the received ultrasound data of the ultrasound input device, generating an image indicative thereof.

In another aspect, a method includes pairing an ultrasound input device of a plurality of ultrasound input devices with at least one ultrasound user interface of a plurality of ultrasound user interfaces. The method further includes registering the paired ultrasound input device and the least one ultrasound user interface with a multi-client ultrasound imaging data processing system. The method further includes acquiring ultrasounds data with the ultrasound input device. The method further includes allocating processing resources of the multi-client ultrasound imaging data processing system to process the acquired ultrasounds data and generate at least one image indicative thereof. The processing resource are shared by the plurality of ultrasound input devices and include a plurality of ultrasound signal processing units, each including a plurality of ultrasound signal processing blocks configured to processes ultrasound data. Allocating processing resources includes temporarily allocating at least one ultrasound processing block to process the received ultrasound data of the ultrasound input device. The method further includes visually displaying the at least one image.

In another aspect, a virtual ultrasound imaging scanner includes an ultrasound input device, at least one ultrasound processing resource from a cloud based multi-client ultrasound imaging data processing system, which is shared by a plurality of ultrasound input devices, including the ultrasound input device, at least one ultrasound user interface. The ultrasound input device and the at least one ultrasound user interface are temporarily paired. The at least one ultrasound processing resource is temporarily allocated to process ultrasound data acquired by the ultrasound input device, generating one or more images indicative thereof, and visually present the one or more images via the at least one ultrasound user interface.

Those skilled in the art will recognize still other aspects of the present application upon reading and understanding the attached description.

BRIEF DESCRIPTION OF THE DRAWINGS

The application is illustrated by way of example and not limitation in the figures of the accompanying drawings, in which like references indicate similar elements and in which.

DETAILED DESCRIPTION

Figure 1:
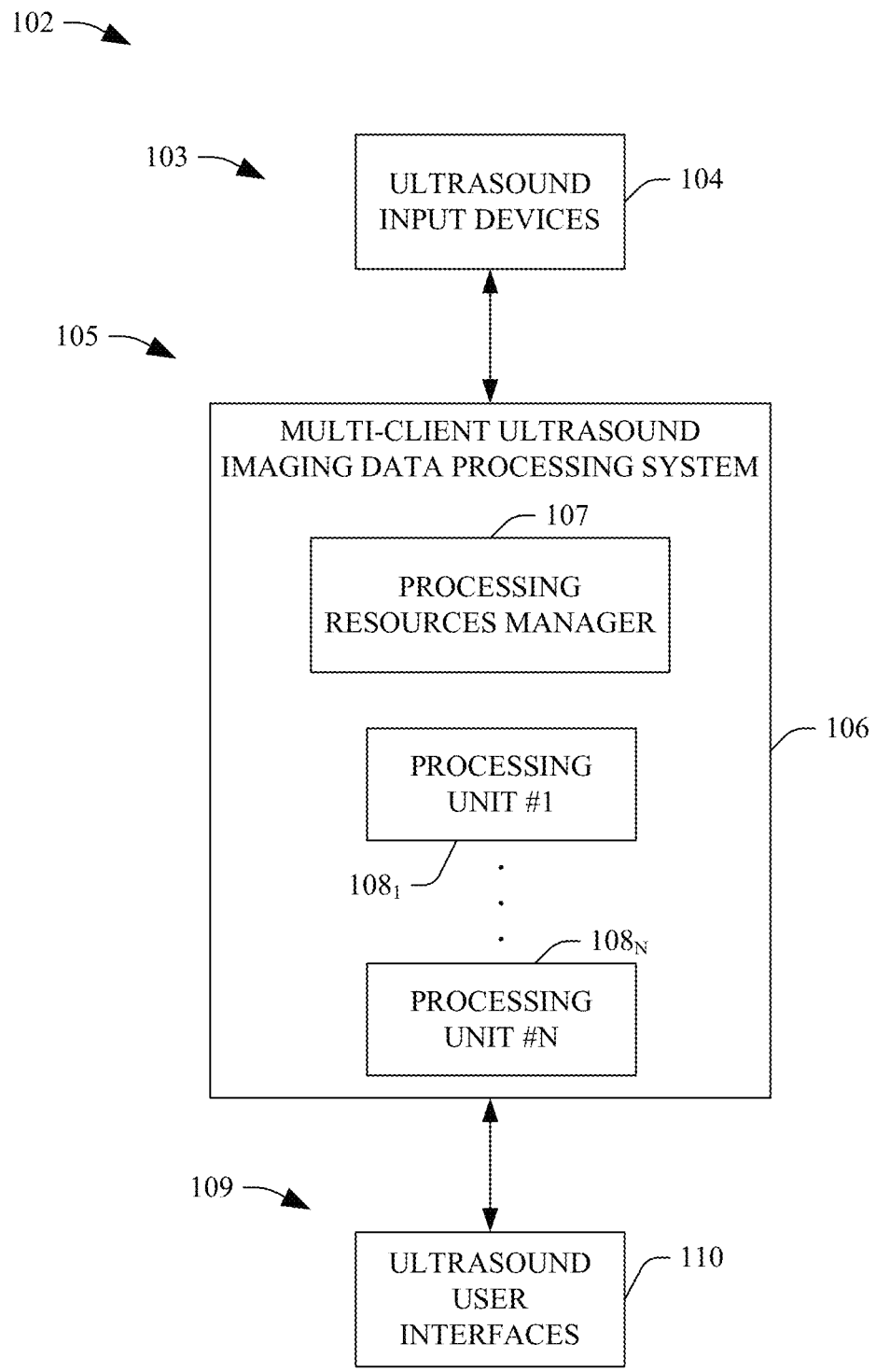
FIG. 1 schematically illustrates an example ultrasound imaging system including one or more ultrasound input devices, one or more processing units of a multi-client ultrasound imaging data processing system, and one or more user interfaces, which are distributed and variously paired to create one or more "virtual" ultrasound imaging systems.

FIG. 1 schematically illustrates an example system 102. The system 102 includes ultrasound imaging data acquisition, data processing and data visualization and manipulation sub-systems 103, 105 and 109, which are physically decoupled from each other in that they are not part of a same physical ultrasound imaging scanner, but instead are distributed across different and distinct systems.

The data acquisition sub-system 103 includes one or more ultrasound input devices (or clients) 104. The data processing sub-system 105 includes a multi-client ultrasound imaging data processing system 106 with one or more ultrasound processing units $108_1, \ldots, 108_N$ (where N is an integer), collectively referred to herein as ultrasound processing units 108. The data visualization and manipulation sub-system 109 includes one or more ultrasound user interfaces devices 110.

A non-limiting example of an ultrasound input device 104 includes an ultrasound probe with a transducer array of one or more ultrasound transducer elements. The probe may include a communication port for connecting a communications cable thereto or a hard-wired communications cable. In either instance, the cable connects to an apparatus in communication with the multi-client ultrasound imaging data processing system 106. Additionally or alternatively, the probe includes a wireless interface for interfacing with the apparatus and/or the system 106.

The processing units 108 of the multi-client ultrasound imaging data processing system 106 can be distributed in that they may reside at different geographical locations, be part of different computing systems, etc. A non-limiting example of a suitable multi-client ultrasound imaging data processing system 106 is "cloud" based system with storage and/or computing resources, such as a park of interconnected servers making up a computer cluster. A processing resources manager 107 manages (e.g., allocates and de-allocates, or releases) processing resource (or blocks) of the multi-client ultrasound imaging data processing system 106.

The one or more ultrasound user interfaces 110 can include a "dumb" terminal that merely displays images and/or other device with a graphics and/or other processor that processes data. Furthermore, at least one of the ultrasound user interfaces 110 can be part of a device such as a smartphone, a tablet computer, a laptop, a television, or the like. In this instance, the device may include and/or be able to download and run a Java applet, a mobile application, or the like, which can be used to processes and/or manipulate images.

As described in greater detail below, the one or more ultrasound input devices 104 and the one or more ultrasound user interfaces 110 can be variously and temporality paired together and the one or more of the one or more ultrasound processing units 108 can be temporality allocated thereto to create one or more "virtual" ultrasound imaging scanners for scanning one or more subject or objects. Before such pairing and allocation, the processing and display resources are not available to process acquired data and display images, and after unpairing and de-allocation, the processing and display resources again are not available to process acquired data and display images.

By way of non-limiting example, this may include allocating processing resources such that a data set from an input device 104 is processed with resources of one or more of the ultrasound processing units 108 and/or visually presented via one or more ultrasound user interfaces 110, located in a same or different location, e.g., an examination room, an image reading room, etc. The data may be processed via a single processing chain or multiple different processing chains, resulting in different images from the same acquired data, which are respectively presented via different ultrasound user interfaces 110.

The allocation of the processing units 108 to an ultrasound input device 104 can be achieved in dynamically, in real-time for example, in that as ultrasound data conveyed to the multi-client ultrasound imaging data processing system 106, processing resources are allocated and the data is processed, based on availability, priority, and/or otherwise. Alternatively, the allocation is predetermined such that particular processing resources are used to process particular data. Furthermore, in either instance, processing resources can be dynamically re-allocated and/or one or more ultrasound user interfaces 110 can be paired added and/or unpaired with the ultrasound input device 104.

With the above, from a user's perspective, the "virtual" ultrasound imaging scanners would appear to be an autonomous physical ultrasound imaging scanner in that the user generally would not be able to tell the difference between the "virtual" ultrasound imaging scanners (temporarily made up acquisition, processing and display components) and a configuration in which the sub-systems 103, 105, and 109 are part of a same local physical apparatus with respect to the data processing and visualization. In general, the ultrasound input device 104 drives or defines the "virtual" ultrasound imaging scanners.

For example, the capabilities and/or functionality of the ultrasound input device 104 define which processing services of the multi-client ultrasound imaging data processing system 106 would be available to the "virtual" ultrasound imaging scanners. By way of example, if the ultrasound input device 104 is configured for 3D acquisitions, the "virtual" ultrasound imaging scanners includes 3D processing algorithms of the multi-client ultrasound imaging data processing system 106. Otherwise, these algorithms will not be part of the "virtual" ultrasound imaging scanners for the particular ultrasound input device 104.

To minimize the technical knowledge required by the clinical user of a "virtual" ultrasound scanner, the ultrasound streams and processing resources may be defined in various ways. For example, in one instance, the streams and processing resources of the processing units 108 are pre-allocated to one or more of the ultrasound input device 104. In another instance, the streams and processing resources are dynamically allocated, for example, based on a load balancing and/or other schemes to ensure a defined level for Quality of Service (QoS) and/or satisfy other criteria.

In one embodiment, the ultrasound input devices 104 and the ultrasound user interfaces 110 register with the multi-client ultrasound imagining data processing system 106 to be recognized and allowed to access the system 106. Registration can be variously performed. For example, in one non-limiting instance, registration is performed manually be entering a unique device identity which invokes recognition and registration via near field communication tags. Other approaches are also contemplated herein. With this embodiment, only registered devices 104 and/or 110 can transmit and/or receive data from the multi-client ultrasound imagining data processing system 106.

In one embodiment, the multi-client ultrasound imagining data processing system 106 can be a subscription based or other system 106, including fee or non-fee based systems. With a subscription based system, before and/or during registration of an ultrasound input device 104 and/or an ultrasound user interface 110, the subscription is authorized, and registration is not allowed without a validated and/or confirmed subscription. Furthermore, the subscription may include multiple levels of subscription, each offering a different level of services and/or performance.

Figure 2:
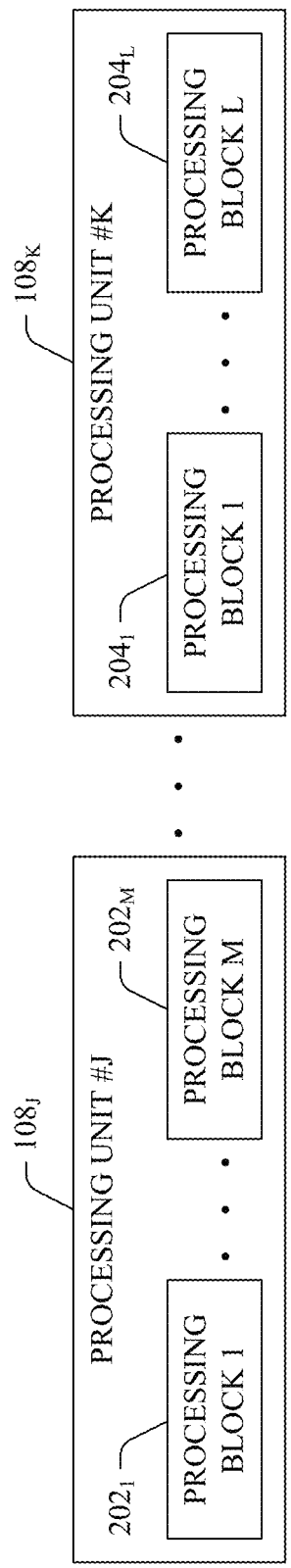
FIG. 2 illustrates an example of the one or more processing units of the multi-client ultrasound imaging data processing system, each including one or more processing blocks.

Turning to FIG. 2, an example of a processing unit $108_J$ (where J is an integer less then N), ..., and a processing unit $108_K$ (where K is an integer less than or equal to N and not equal to J) of the one or more processing units 108 is schematically illustrated.

The processing unit $108_J$ includes M processing blocks (where M is an integer equal to or greater than one), including a processing block $202_1$, ..., a processing block $202_M$, collectively referred to herein as processing blocks 202. In one instance, the processing blocks 202 are configured to perform different ultrasound data processing functions. In another instance, at least one of the processing blocks 202 is configured to perform a same set of ultrasound data processing functions as another of the processing blocks 202.

The processing unit $108_K$ includes L processing blocks (where L is an integer equal to or greater than one and may or may not be equal to M), including a processing block $204_1$, ..., a processing block $204_L$, collectively referred to herein as processing blocks 204. In one instance, the processing blocks 204 are configured to perform different ultrasound data processing functions. In another instance, at least one of the processing blocks 204 is configured to perform a same set of ultrasound data processing functions as another of the processing blocks 204.

Figure 3:
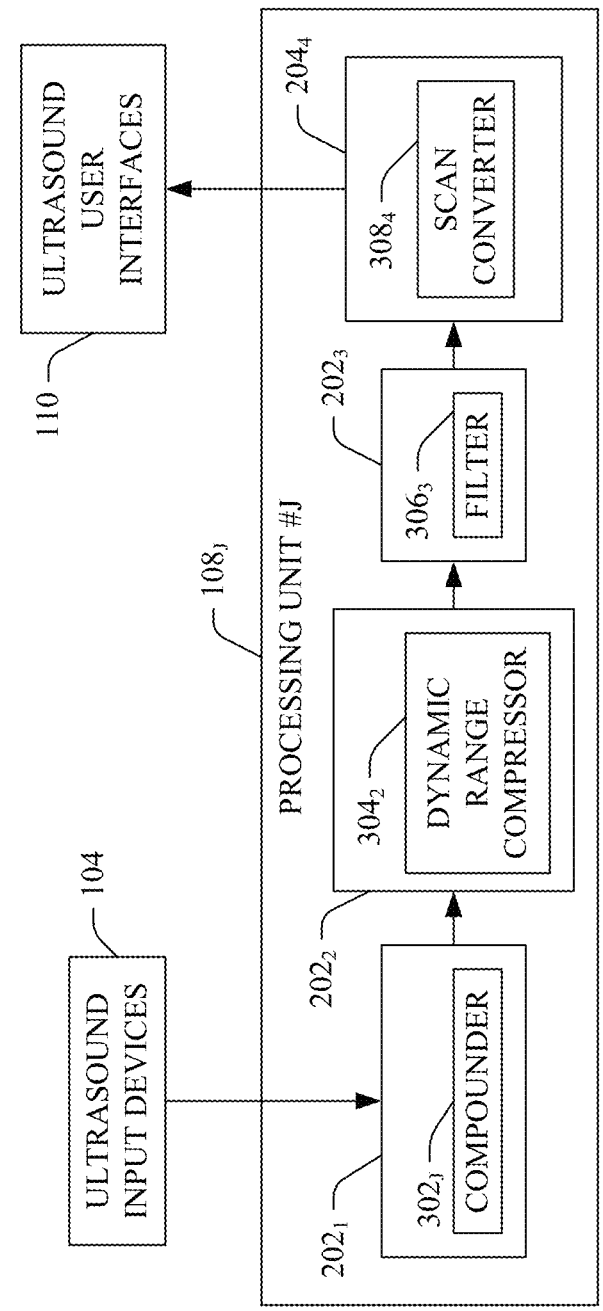
FIG. 3 illustrates an example processing unit of the multi-client ultrasound imaging data processing system which the processing blocks include different processing components.

FIG. 3 shows an example of the processing unit $108_J$ in which M≥4 and at least includes processing blocks $202_1$, $202_2$, $202_3$ and $202_4$.

In FIG. 3, the processing block $202_1$ includes a compounder $302_J$ that compounds or combines the ultrasound data, the processing block $202_2$ includes a dynamic range compressor $304_J$ that compresses or reduces the dynamic range of the compounded data, the processing block $202_3$ includes a filter $306_J$ that filters the dynamic range reduced data, and the processing block $202_4$ includes a scan converter $308_J$ that converts the filtered ultrasound data into a format suitable for display. Other and/or different processing components may be included in other embodiments.

In FIG. 3, the processing unit $108_J$ receives ultrasound data (e.g., raw or pre-processed) from one or more of the ultrasound input devices 104, processes the ultrasound data generating one or more images, and conveys the one or more images to one or more of the ultrasound user interfaces 110. Alternatively, the one or more of the ultrasound user interfaces 110 can generate the images. In another instance, the ultrasound data can be similarly or differently processed, concurrently and/or sequentially, using two or more of the processing units 108. This is shown in FIG. 4.

Figure 4:
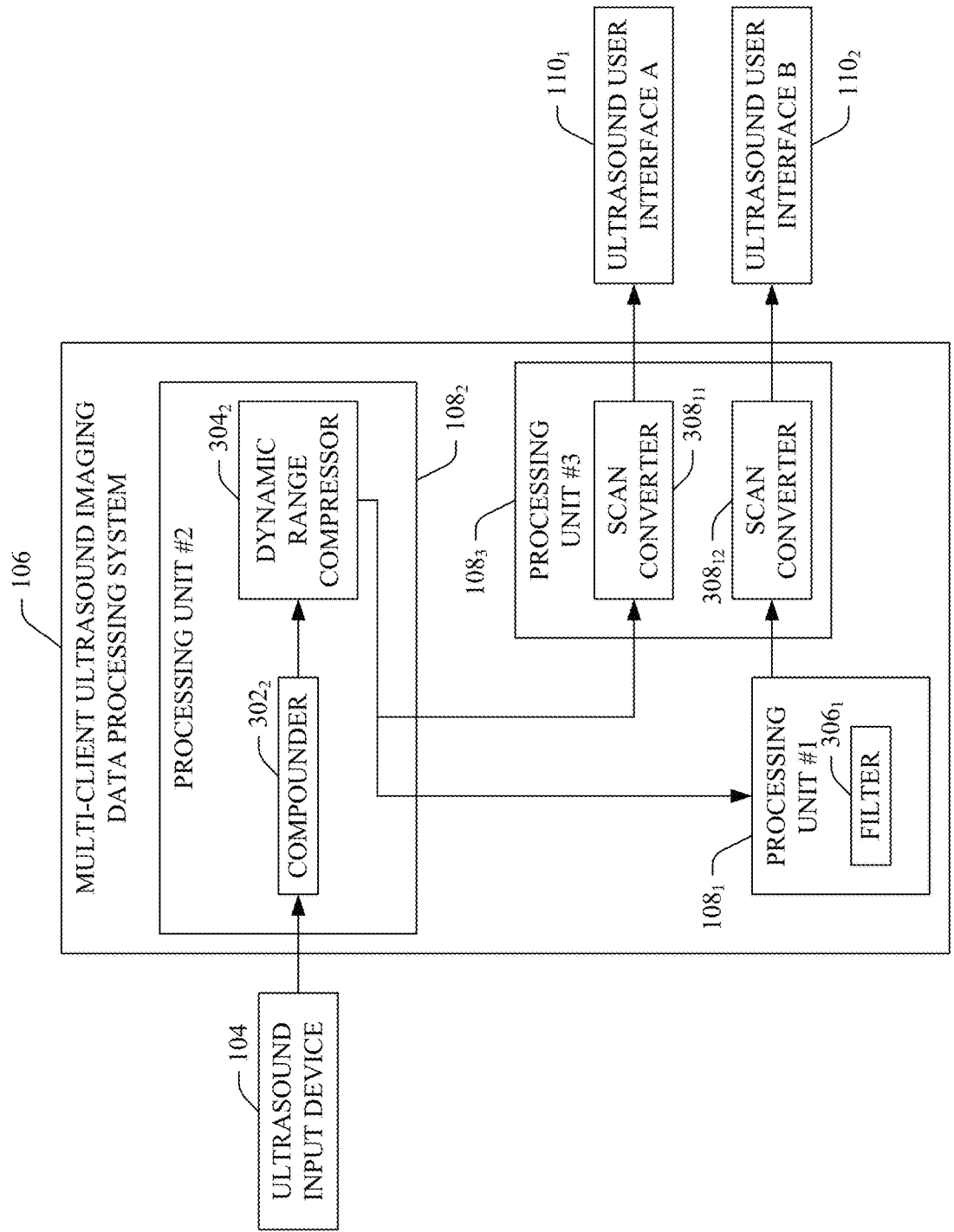
FIG. 4 illustrates an example in which data from a single ultrasound input device is sequentially processed by different processing blocks of the multiple processing units of the multi-client ultrasound imaging data processing system.

In FIG. 4, acquired ultrasound data (e.g., raw or pre-processed) from an ultrasound input device 104 is conveyed to the processing unit $108_2$ of the multi-client ultrasound imaging data processing system 106, which compounds and then compresses the dynamic range of the compounded data, respectively with a compounder $302_2$ and a compressor $304_2$. The processed data is then conveyed to both a processing unit $108_1$ and a processing unit $108_3$. The processed data can be concurrently and/or sequentially conveyed to the processing units $108_1$ and $108_3$.

In this example, the processing unit $108_1$ filters the processed data with a filter $306_1$ and conveys the filtered data to the processing unit $108_3$. The processing unit $108_3$ scan coverts the processed data from the processing unit $108_2$ with a scan converter $308_{11}$ and conveys the scan converted data to an ultrasound user interface $110_1$ and scan coverts the filtered data from the processing device $108_1$ with a scan converter $308_{12}$ and conveys the scan converted data to an ultrasound user interface $110_2$. In another instance, the scan converters $308_{11}$ and $308_{12}$ are the same scan converter.

For the example of FIG. 4, the data from a single ultrasound examination is processed with different sets of algorithms of different processing blocks 202 from different processing units 108, and streamed and visually presented via different ultrasound user interfaces 110. The particular processing units 108 and/or the particular processing blocks 202 utilized for processing this data may be allocated depending on the resource requirements (e.g., hardware), a default or preferred configuration, and/or otherwise. In addition, the allocation can be accomplished by available best fit and/or other allocation determining algorithms.

Routing and transmission of data between the processing units 108 can be accomplished through standard available and/or other protocols. It is to be appreciated that the processing unit $108_2$ may or may not have resources for filtering or scan converting, the processing unit $108_1$ may or may not have resources for compounding, dynamic range compressing or scan converting, and/or the processing unit $108_3$ may or may not have resources for compounding, dynamic range compressing or filtering.

Figure 5:
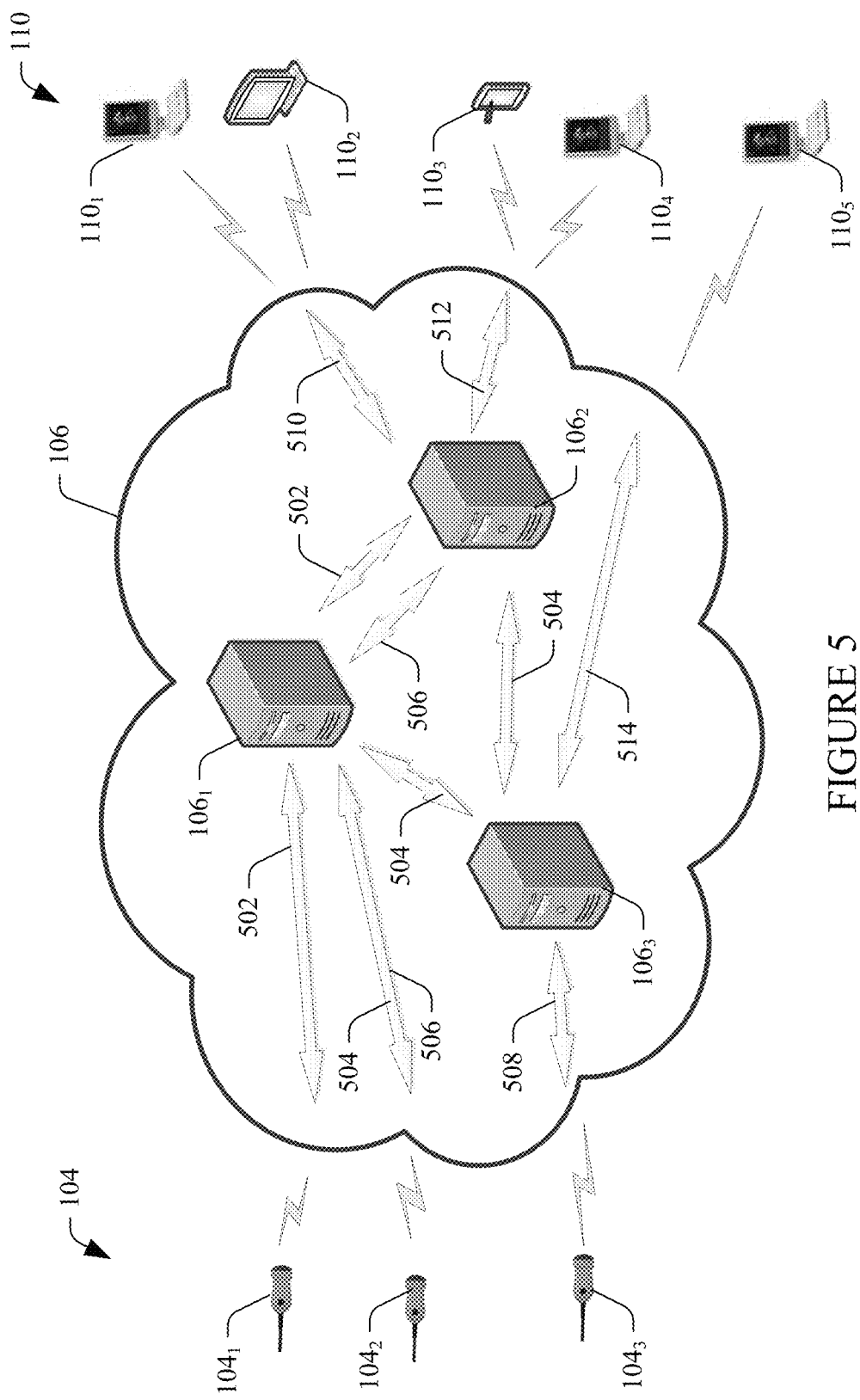
FIG. 5 illustrates an example in which data from multiple ultrasound input devices are concurrently and/or sequentially processed by the processing units of the multi-client ultrasound imaging data processing system.

FIG. 5 illustrates an example in which multiple ultrasound input devices 104 and multiple ultrasound user interface 110 are registered with a cloud based multi-client ultrasound imaging data processing unit 106.

In this example, three ultrasound input devices $104_1$, $104_2$ and $104_3$ are registered with the multi-client ultrasound imaging data processing system 106. As such, at least three "virtual" ultrasound systems are created and activated for imaging patients. Each of the three ultrasound input devices $104_1$, $104_2$ and $104_3$ is used with a different subject or object. Note that an ultrasound input interface 110 may be paired and/or unpaired with the three ultrasound input devices $104_1$, $104_2$ and $104_3$ at any time.

In this example, data from the ultrasound input device $104_1$ is processed through path 502 by processing units $106_1$ and $106_2$. Data from the ultrasound input device $104_2$ is processed through paths 504 and 506. For path 504, the data is processed with the processing units $106_1$, $106_3$ and $106_2$. For path 506, the data is processed with the processing units $106_1$ and $106_2$. Data from the ultrasound input device $104_3$ is processed through path 508 by the processing unit $106_3$.

In this example, the processed data corresponding to the ultrasound input device $104_1$ is transmitted via a path 510 and visually presented via ultrasound user interfaces $110_1$ and $110_2$. The data may or may not have been processed by the same chain of processing blocks 202. Where a single chain is employed, the same images are visually presented via ultrasound user interfaces $110_1$ and $110_2$. Where multiple chains are employed, different images can be visually presented via ultrasound user interfaces $110_1$ and $110_2$.

The processed data corresponding to the ultrasound input device $104_2$ is transmitted via a path 512 and visually presented via ultrasound user interfaces $110_3$ and $110_4$. Since this data is processed with more than one processing chains, the ultrasound user interfaces $110_3$ and $110_4$ display different images. The processed data corresponding to the ultrasound input device $104_3$ is transmitted via a path 514 and visually presented via ultrasound user interface $110_5$.

It is to be understood that the embodiments described herein are non-limiting, and other embodiments are contemplated herein. For example, another embodiment may include a combination of the embodiments described herein, with or without variations. Another embodiment includes two or more of the systems 102.

Figure 6:
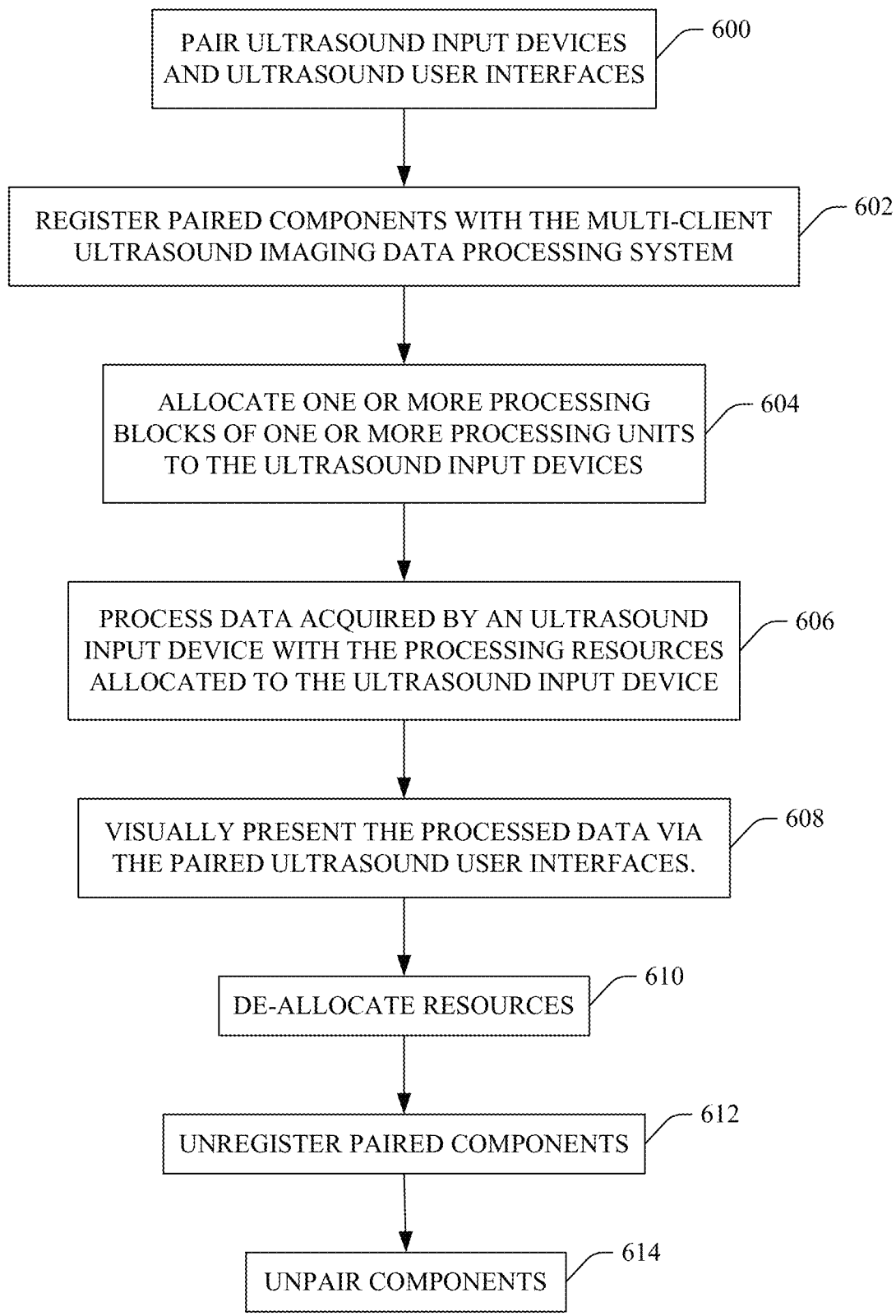
FIG. 6 illustrates an example method in accordance with the embodiments disclosed herein.

FIG. 6 illustrate an example method for employing the multi-client ultrasound imaging data processing system 106.

It is to be appreciated that the order of the following acts is provided for explanatory purposes and is not limiting. As such, one or more of the following acts may occur in a different order. Furthermore, one or more of the following acts may be omitted and/or one or more additional acts may be added.

At 600, one or more ultrasound input devices 104 and one or more ultrasound user interfaces 110 are paired. This includes at least pairing one of the ultrasound input devices 104 with one or more of the ultrasound user interfaces 110. Note that the ultrasound user interfaces 110 can be subsequently unpaired with the one or more ultrasound input devices 104 and/or other ultrasound user interfaces 110 can subsequently be paired with the one or more ultrasound input devices 104.

At 602, the paired one or more ultrasound input device 104 and one or more ultrasound user interfaces 110 are registered with the multi-client ultrasound imaging data processing system 106.

In one instance, registration can be achieved for an ultrasound input device 104 merely by activating the ultrasound input device 104, for example, turning the ultrasound input device 104 on, physically pressing a dedicated button, pressing a transducer towards the skin, etc. The activated ultrasound input device 104 transmits a signal to the multi-client ultrasound imaging data processing system 106, which is used to register the activated ultrasound input device 104.

Transmission of the signal may be deactivated similar to that described for activation and/or otherwise, for example, tiered down after a preconfigured duration of time after activation. Optionally, the data transmitted from the ultrasound input device 104 to the multi-client ultrasound imaging data processing system 106 is uniquely marked for the examination. The unique identifier can then be used throughout the system 106, which may ensure the integrity.

At 604, resources (i.e., processing units 108 and/or processing blocks 202) of the multi-client ultrasound imaging data processing system 106 are allocated to the one or more ultrasound input device 104 and/or the one or more ultrasound user interfaces 110. As discussed herein, resources can be allocated dynamically when the data is received for processing and/or based on a pre-determined allocation.

At 606, data from the one or more ultrasound input device 104 is processed via the allocated resources of the multi-client ultrasound imaging data processing system 106. As discussed herein, data from any one of the ultrasound input device 104 can be processed via a single and/or multiple processing chains, utilizing one or more of the processing blocks 202 of one or more of the processing units 108.

Where a plurality of ultrasound input devices 104 compete for communication bandwidth and/or particular processing resources, a priority may be utilized for the allocation of the resources and/or used to determine a processing order. By way of example, the priority can be used to ensure an uninterrupted data flow, e.g. when using the ultrasound input device 104 during surgery, whereas a procedure with more flexibility may not receive an uninterrupted data flow.

At 608, the processed data is respectively conveyed to the ultrasound user interface(s) 110 corresponding to the one or more ultrasound user interfaces 110. As discussed herein, processed data may be conveyed to one or more ultrasound user interfaces 110, located in the same or different location. In addition, differently processed data may correspond to the same raw data.

At 610, the resources allocated for one of the ultrasound input devices are de-allocated, or released, and made available for ultrasound input devices and/or another examination by the ultrasound input device.

At 612, the ultrasound input device 104 and the one or more ultrasound user interfaces 110 are unregistered with the multi-client ultrasound imaging data processing system 106.

At 614, the ultrasound input device 104 and the one or more ultrasound user interfaces 110 are upaired.

It is to be appreciated that the unpaired ultrasound input device 104 and the one or more ultrasound user interfaces 110 are available for another examination in which acts 600 to 614 can be repeated. It is also to be appreciated that multiple ultrasound input devices 104 can be paired with the one or more ultrasound user interfaces 110 and concurrently or sequentially utilize the processing resources of the multi-client ultrasound imaging data processing system 106.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. An ultrasound imaging scanner, comprising:
an ultrasound input device, of a plurality of ultrasound input devices, that includes an array of transducer elements, which transmits an ultrasound signal and receives raw unprocessed ultrasound data produced in response thereto; and
a multi-client ultrasound imaging data processing system that includes processing resources which are shared by the plurality of ultrasound input devices, wherein the processing resources include a plurality of ultrasound signal processing units, each including a plurality of ultrasound signal processing blocks configured to processes a signal from the ultrasound input device indicative of the raw unprocessed ultrasound data, and wherein the multi-client ultrasound imaging data system temporarily allocates multiple different ultrasound signal processing blocks, each including at least one processor configured to process the raw unprocessed ultrasound data of the signal from the ultrasound input device, generating a first image with a first ultrasound signal processing block of the multiple different ultrasound signal processing blocks and a second different image with a second ultrasound signal processing block of the multiple different ultrasound signal processing blocks, the first image and the second different image indicative of the raw unprocessed ultrasound data.

2. The ultrasound imaging scanner of claim 1, wherein the at least one processing block includes two or more processing blocks of a same one of the plurality of processing units.

3. The ultrasound imaging scanner of claim 2, wherein the two or more processing blocks perform different processing functions.

4. The ultrasound imaging scanner of claim 1, wherein the at least one processing block includes two or more processing blocks of different processing units of the plurality of processing units.

5. The ultrasound imaging scanner of claim 4, the multi-client ultrasound imaging data processing system, further comprising:
a processing resources manager that allocates the plurality of processing blocks to the ultrasound input devices, including allocating the at least one processing block to the ultrasound input device.

6. The ultrasound imaging scanner of claim 5, wherein the processing resources manager allocates the at least one processing block to the ultrasound input device based on a predetermined allocation.

7. The ultrasound imaging scanner of claim 5, wherein the processing resources manager allocates the at least one processing block to the ultrasound input device in response to receiving the ultrasound data based on available and required processing as the ultrasound data is received.

8. The ultrasound imaging scanner of claim 7, wherein the processing resources manager allocates the at least one processing block between multiple ultrasound input devices competing for the at least one processing block based on a predetermined priority.

9. The ultrasound imaging scanner of claim 5, wherein the processing resources manager de-allocates the allocated at least one processing block for allocation to another ultrasound input device in response to the ultrasound input device no longer needing the allocated at least one processing block.

10. The ultrasound imaging scanner of claim 1, further comprising:
at least one ultrasound user interface that at least visually presents the image, wherein the at least one ultrasound user interface is temporarily paired with the ultrasound input device for presenting the image and unavailable to be paired with another ultrasound input device.

11. The ultrasound imaging scanner of claim 10, wherein the at least one ultrasound user interface is unpaired with the ultrasound input device and available for pairing with another ultrasound user interface.

12. The ultrasound imaging scanner of claim 1, further comprising:
at least a second ultrasound user interface temporarily paired with the ultrasound input device, wherein the at least one ultrasound user interface visually presents a first of the images and the at least a second ultrasound user interface visually presents a second of the images.

13. The ultrasound imaging scanner of claim 12, wherein the at least one ultrasound user interface and the at least a second ultrasound user interface are located in two different viewing rooms.

14. A method, comprising:
pairing an ultrasound input device of a plurality of ultrasound input devices with at least one ultrasound user interface of a plurality of ultrasound user interfaces;
registering the paired ultrasound input device and the least one ultrasound user interface with a multi-client ultrasound imaging data processing system;
acquiring raw ultrasound data with the ultrasound input device which generates acquired raw ultrasound data;
allocating processing resources of the multi-client ultrasound imaging data processing system to process the acquired raw ultrasound data and generate at least one image indicative thereof,
wherein the processing resource are shared by the plurality of ultrasound input devices and include a plurality of ultrasound signal processing units, each including a plurality of ultrasound signal processing blocks with at least one processor configured to process the raw ultrasound data and generated different image thereof, and
wherein allocating processing resources includes temporarily allocating at least one ultrasound processing block to process the acquired raw ultrasound data, thereby generating an allocated at least one ultrasound processing block; and
visually displaying at least one of the generated different image.

15. The method of claim 14, wherein the at least one ultrasound processing block includes two or more processing blocks of a same one of the plurality of ultrasound signal processing units, and comprising:
processing the acquired raw ultrasound data sequentially with the two or more processing blocks.

16. The method of claim 15, wherein the two or more processing blocks perform different processing functions.

17. The method of claim 14, wherein the at least one processing block includes two or more processing blocks of different processing units of the plurality of processing units, and comprising:
processing the acquired raw ultrasound data sequentially with the two or more processing blocks.

18. The method of claim 14, further comprising:
allocating the at least one ultrasound processing block to the ultrasound input device based on a predetermined allocation.

19. The method of claim 14, further comprising:
allocating the at least one ultrasound processing block to the ultrasound input device in response to receiving the acquired raw ultrasound data based on available and required processing as the ultrasound data is received.

20. The method of claim 14, wherein the at least one ultrasound processing block is allocated to multiple ultrasound input devices competing for the at least one ultrasound processing block based on a priority.

21. The method of claim 14, further comprising:
releasing the allocated at least one ultrasound processing block for allocation to another ultrasound input device.

22. The method of claim 14, further comprising:
unpairing the at least one ultrasound user interface and the ultrasound input device.

23. The method of claim 14, further comprising:
processing the acquired raw ultrasound data with multiple different chains of processing blocks, producing multiple different images from the same ultrasound data.

24. The method of claim 23, further comprising:
visually presenting a first image of the multiple different images via a first ultrasound user interface and visually presenting a second image of the multiple different images via a second ultrasound user interface.

* * * * *